(12) United States Patent
Nakayama (10) Patent No.: US 10,511,173 B2
(45) Date of Patent: Dec. 17, 2019

(54) POWER CONTROLLER, POWER CONTROL METHOD, AND POWER CONTROL SYSTEM

(71) Applicant: KYOCERA Corporation, Kyoto-shi, Kyoto (JP)

(72) Inventor: Shusuke Nakayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 394 days.

(21) Appl. No.: 14/908,091

(22) PCT Filed: Jul. 29, 2014

(86) PCT No.: PCT/JP2014/003971
§ 371 (c)(1),
(2) Date: Jan. 27, 2016

(87) PCT Pub. No.: WO2015/015798
PCT Pub. Date: Feb. 5, 2015

(65) Prior Publication Data
US 2016/0211670 A1    Jul. 21, 2016

(30) Foreign Application Priority Data

Jul. 29, 2013  (JP) ................................ 2013-157062

(51) Int. Cl.
*H02J 1/00* (2006.01)
*H02J 3/00* (2006.01)
(Continued)

(52) U.S. Cl.
CPC ............. *H02J 3/383* (2013.01); *H02J 3/387* (2013.01); *H02M 3/04* (2013.01); *H02M 7/44* (2013.01); *Y02E 10/563* (2013.01)

(58) Field of Classification Search
CPC ............ H02J 3/383; H02J 3/387; H02M 3/04; H02M 7/44; Y02E 10/563
(Continued)

(56) References Cited

U.S. PATENT DOCUMENTS

2011/0187194 A1*  8/2011  Keimling .................. H02J 9/06
                                                                   307/65
2011/0291449 A1* 12/2011  Serlachius ............. A47C 7/402
                                                                   297/230.11
(Continued)

FOREIGN PATENT DOCUMENTS

CN          102804540 A     11/2012
EP          2 451 042 A1     5/2012
(Continued)

OTHER PUBLICATIONS

Office Action dated Jun. 21, 2017 issued in counterpart Chinese Application No. 201480039816.3.
(Continued)

*Primary Examiner* — Rexford N Barnie
*Assistant Examiner* — Toan T Vu
(74) *Attorney, Agent, or Firm* — Procopio Cory Hargreaves and Savitch LLP (57) ABSTRACT

A power controller capable of grid interconnection of at least one distributed power source of a first type and at least one distributed power source of a second type together includes: a switch configured to switch between a parallel state in which the at least one distributed power source of the second type is interconnected to a grid together with the at least one distributed power source of the first type and a parallel off state in which the at least one distributed power source of the second type is independent of the at least one distributed power source of the first type and is paralleled off from the grid; and a controller configured to cause the switch to be in the parallel off state when reverse power flow occurs.

11 Claims, 3 Drawing Sheets

(51) Int. Cl.
*H02J 3/38* (2006.01)
*H02M 3/04* (2006.01)
*H02M 7/44* (2006.01)

(58) Field of Classification Search
USPC .................................................. 307/87, 43
See application file for complete search history.

(56) References Cited

U.S. PATENT DOCUMENTS

| | | | | |
|---|---|---|---|---|
| 2012/0038313 | A1* | 2/2012 | Ananthakrishna | H02J 7/34 320/101 |
| 2012/0047386 | A1* | 2/2012 | Matsui | H01M 10/465 713/340 |
| 2012/0299383 | A1* | 11/2012 | Cyuzawa | H02J 3/381 307/75 |
| 2013/0069659 | A1* | 3/2013 | Iwasaki | H02J 3/32 324/426 |
| 2013/0162037 | A1* | 6/2013 | Kim | H02J 7/0068 307/24 |
| 2014/0042811 | A1 | 2/2014 | Myamoto et al. | |
| 2014/0265585 | A1* | 9/2014 | Della Sera | H02J 3/38 307/52 |

FOREIGN PATENT DOCUMENTS

| | | |
|---|---|---|
| JP | H08-186935 A | 7/1996 |
| JP | 2002-199592 A | 7/2002 |
| JP | 2007-028735 A | 2/2007 |
| JP | 2011-120452 A | 6/2011 |
| JP | 2011-181377 A | 9/2011 |
| JP | 2012-228043 A | 11/2012 |
| WO | 2013/077124 A1 | 5/2013 |

OTHER PUBLICATIONS

Office Action dated Jan. 9, 2018 issued in counterpart Japanese Application No. 2017-133122.
Extended European Search Report dated Mar. 7, 2017, issued by the European Patent Office in counterpart European Patent Application No. 14 83 1535.1.
International Search Report issued by Japan Patent Office for International Application No. PCT/JP2014/003971.
Written Opinion of the International Searching Authority issued by Japan Patent Office for International Application No. PCT/JP2014/003971.

* cited by examiner

POWER CONTROLLER, POWER CONTROL METHOD, AND POWER CONTROL SYSTEM

CROSS REFERENCE TO RELATED APPLICATION

This application claims the benefit of International application number PCT/JP2014/003971 filed on Jul. 29, 2014, which claims priority to and the benefit of Japanese Patent Application No. 2013-157062 filed Jul. 29, 2013, the entire disclosure of which is incorporated herein by reference.

TECHNICAL FIELD

The disclosure relates to a power controller, a power control method, and a power control system. The disclosure particularly relates to a power controller capable of grid interconnection of a plurality of distributed power sources, a power control method in the power controller, and a power control system including the power controller.

BACKGROUND

Power controllers that support both power generators, e.g. photovoltaic cells, and storage batteries are known in recent years. Such a power controller supplies the outputs of a power generator and storage battery to a grid and/or loads, thus performing interconnection operation or independent operation. The power controller may also supply the DC power output from the power generator directly to the storage battery, to charge the storage battery (for example, Patent Literature 1).

CITATION LIST

Patent Literature 1: JP 2012-228043 A

SUMMARY

Technical Problem

Conventional power controllers capable of grid interconnection of the outputs of a plurality of distributed power sources do not have satisfactory power control performance in reverse power flow to an electric power grid (commercial power source) when, for example, selling power to the commercial power source. Hence, there are still users' demands for more convenient power controllers.

It could therefore be helpful to provide a more convenient power controller, power control method, and power control system capable of grid interconnection of the outputs of a plurality of distributed power sources.

Solution to Problem

To achieve the stated object, a first aspect according to the disclosure is a power controller capable of grid interconnection of at least one distributed power source of a first type and at least one distributed power source of a second type together, the power controller including: a switch configured to switch between a parallel state in which the at least one distributed power source of the second type is interconnected to a grid together with the at least one distributed power source of the first type and a parallel off state in which the at least one distributed power source of the second type is independent of the at least one distributed power source of the first type and is paralleled off from the grid; and a controller configured to cause the switch to be in the parallel off state when reverse power flow occurs.

The switch may be placed before a position where power generated by the at least one distributed power source of the first type and power generated by the at least one distributed power source of the second type are converted into AC power together.

The power controller may include a sensor configured to detect that at least one of an output of the at least one distributed power source of the first type and an output of the at least one distributed power source of the second type reversely flows to the grid.

The at least one distributed power source of the first type may be capable of reverse power flow, and the at least one distributed power source of the second type not capable of reverse power flow.

The at least one distributed power source of the first type may be a photovoltaic power generator or a wind power generator, and the at least one distributed power source of the second type a power generator other than a photovoltaic power generator and a wind power generator.

The at least one distributed power source of the second type may include a storage battery and a power generator.

The controller may be configured to cause power generated by the power generator to be stored in the storage battery when power generated by the at least one distributed power source of the first type reversely flows to the grid.

The controller may be configured to control power storage in the storage battery, based on at least one of a power generation schedule of the power generator, a power storage schedule of the storage battery, and an amount of power stored in the storage battery.

The controller may be configured to control power supply to a load, based on at least one of a power generation schedule of the power generator, a power storage schedule of the storage battery, and an amount of power stored in the storage battery.

To achieve the stated object, a second aspect according to the disclosure is a power control method for grid interconnection of at least one distributed power source of a first type and at least one distributed power source of a second type together, the power control method including steps of: detecting reverse power flow; and causing the at least one distributed power source of the second type to be interconnected to a grid together with the at least one distributed power source of the first type when no reverse power flow occurs, and causing the at least one distributed power source of the second type to be independent of the at least one distributed power source of the first type and be paralleled off from the grid when reverse power flow occurs.

To achieve the stated object, a third aspect according to the disclosure is a power control system including: at least one distributed power source of a first type; at least one distributed power source of a second type; and a power controller capable of grid interconnection of the at least one distributed power source of the first type and the at least one distributed power source of the second type together, wherein the power controller is configured to cause the at least one distributed power source of the second type to be interconnected to a grid together with the at least one distributed power source of the first type when no reverse power flow occurs, and cause the at least one distributed power source of the second type to be independent of the at least one distributed power source of the first type and be paralleled off from the grid when reverse power flow occurs.

Advantageous Effect

It is thus possible to provide a more convenient power controller, power control method, and power control system capable of grid interconnection of the outputs of a plurality of distributed power sources.

DETAILED DESCRIPTION

The following describes one of the disclosed embodiments with reference to drawings.

Power controllers capable of grid interconnection of the outputs of a plurality of distributed power sources, such as a photovoltaic power generation system, a fuel cell power generation system, and a storage battery, are being developed in recent years. Conventionally, each of these different types of power sources used to be mainly controlled by an individual power controller such as a power conditioner. In the case of combining the outputs of the plurality of distributed power sources, however, the outputs of the distributed power sources may be grid-interconnected together by one power controller. Although the following describes a system in which a plurality of distributed power sources such as the above are DC-linked as one of the disclosed embodiments, the structure described in the embodiment is not a limitation.

Figure 1:
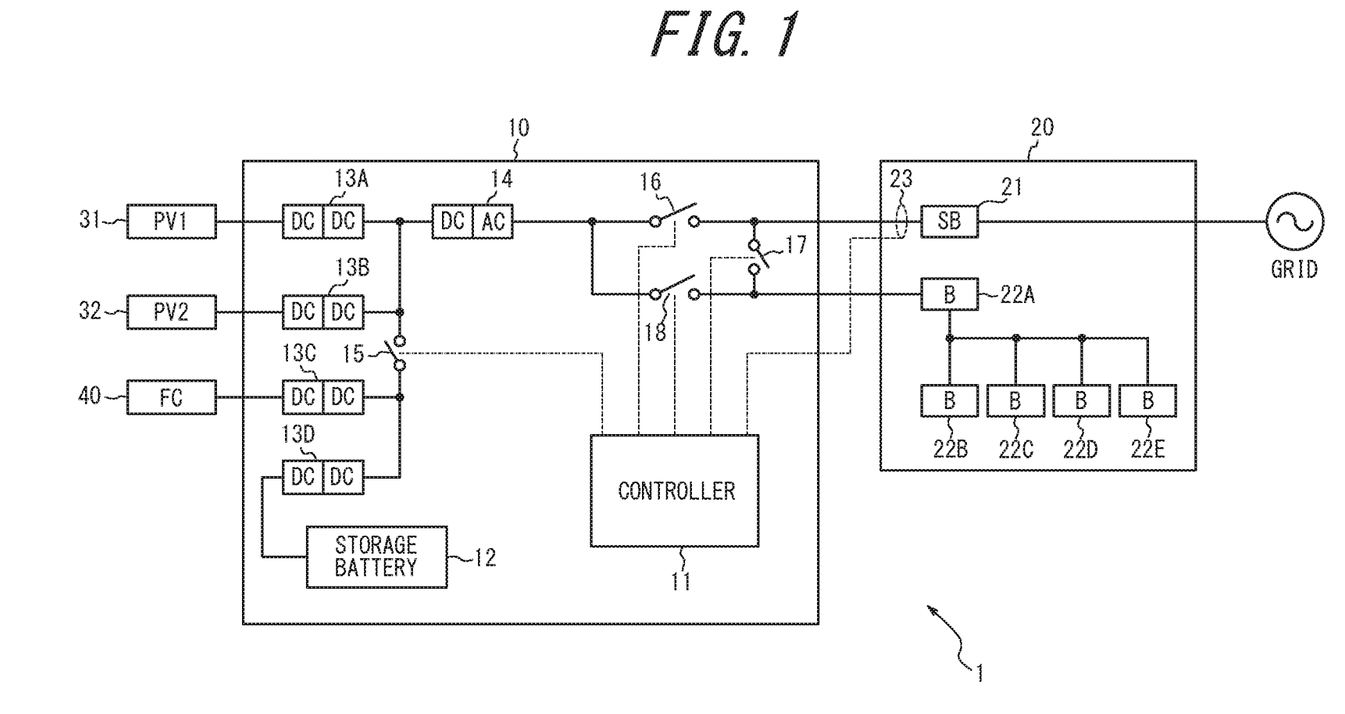
FIG. 1 is a functional block diagram schematically illustrating a power control system according to one of the disclosed embodiments.

FIG. 1 is a functional block diagram schematically illustrating a power control system according to one of the disclosed embodiments.

As illustrated in FIG. 1, a power control system 1 according to this embodiment includes a power controller 10, a storage battery 12, photovoltaic power generators 31 and 32, and a fuel cell power generator 40.

In this embodiment, a distributed power source capable of reverse power flow, such as the photovoltaic power generator 31 or 32, is referred to as a "distributed power source of a first type". Power by a distributed power source "capable of reverse power flow" in this description is power based on renewable energy such as power by photovoltaic power generation or wind power generation, which is currently permitted to be sold in Japan as an example. In this embodiment, a distributed power source not capable of reverse power flow, such as the fuel cell power generator 40 or the storage battery 12, is referred to as a "distributed power source of a second type". Power by a distributed power source "not capable of reverse power flow" in this description is power based on energy supplied from an infrastructure such as power by fuel cell power generation, which is currently not permitted to be sold in Japan as an example. In this embodiment, for example, the distributed power source of the first type is a photovoltaic power generator or a wind power generator, and the distributed power source of the second type is a power generator other than a photovoltaic power generator and a wind power generator.

In this embodiment, the power control system 1 includes at least one distributed power source of the first type and at least one distributed power source of the second type. Although the photovoltaic power generators are used as representative examples of the distributed power source capable of reverse power flow and the fuel cell power generator and the storage battery as representative examples of the distributed power source not capable of reverse power flow in this embodiment, the two types of distributed power sources are not limited to these examples.

The power controller 10 grid-interconnects at least one distributed power source of the first type and at least one distributed power source of the second type together, as illustrated in FIG. 1. In the case where the power controller 10 grid-interconnects a plurality of distributed power sources together in this way, a distribution board 20 is placed between the power controller 10 and the electric power grid.

The distribution board 20 includes a service breaker 21 and breakers 22A to 22E. In the case where the plurality of distributed power sources are grid-interconnected together, the service breaker 21 is situated between the power controller 10 and the electric power grid and, for example during forward power flow, interrupts power exceeding contract capacity. The breakers 22A to 22E are safety breakers disposed at the position where power is branched from the distribution board 20 to various loads in a home or the like. The breakers 22B to 22E each supply power to a corresponding load. The breakers 22A to 22E interrupt power in the event of, for example, a short circuit or overcurrent due to a failure of an electric appliance or cable in a room in the home. The distribution board 20 may also include various functional units such as earth leakage breakers, although their detailed description is omitted here.

The photovoltaic power generators 31 and 32 may generate power using sunlight. The photovoltaic power generators 31 and 32 each include a photovoltaic cell power generation device, and convert the energy of sunlight directly into electricity. This embodiment assumes the photovoltaic power generators 31 and 32 to be in the form in which, for example, a solar panel mounted on the rooftop of a home or the like generates power using sunlight. However, the photovoltaic power generators 31 and 32 may be in any form as long as they can convert the energy of sunlight into electricity.

Although two photovoltaic power generators, i.e. the photovoltaic power generators 31 and 32, are illustrated in FIG. 1, the number of distributed power sources of the first type capable of reverse power flow in this embodiment is any number not less than 1 as mentioned above.

The photovoltaic power generators 31 and 32 may supply power to the electric power grid (commercial power source), as illustrated in FIG. 1. In other words, the photovoltaic power generators 31 and 32 may be grid-interconnected. The power generated by the photovoltaic power generators 31 and 32 may thus reversely flow and be sold to the electric power grid.

The fuel cell power generator 40 may generate power by a fuel cell power generation device that causes an electrochemical reaction of gas such as hydrogen and oxygen supplied from outside, and supply the generated power. In this embodiment, the fuel cell power generator 40 may be capable of independent operation, that is, capable of operating without power from the electric power grid after the fuel cell is activated. In this embodiment, the fuel cell power generator 40 includes other functional units such as a reformer as appropriate so as to be capable of independent operation. The fuel cell power generator 40 is a SOFC as an example. The fuel cell power generator 40 is, however, not limited to a SOFC, and may be any distributed power source capable of generating power but not capable of reverse power flow.

The power generated by the fuel cell power generator 40 may be supplied to various loads that consume power, through the power controller 10 and the distribution board 20. The various loads mentioned here collectively refer to appliances, such as home appliances, that are supplied with power from the power control system 1 and utilized by the user(s).

The storage battery 12 may be discharged to supply power. The storage battery 12 may also be charged with power supplied from the photovoltaic power generators 31 and 32, the fuel cell power generator 40, or the like. The discharge power from the storage battery 12 may be supplied to the various loads that consume power, through the power controller 10 and the distribution board 20. In the case where the power generated by the photovoltaic power generators 31 and 32 and the fuel cell power generator 40 and the discharge power from the storage battery 12 are not sufficient as the power supplied to the various loads, the shortage may be purchased from the electric power grid.

Although one fuel cell power generator 40 and one storage battery 12 are illustrated in FIG. 1, the number of distributed power sources of the second type not capable of reverse power flow in this embodiment is any number not less than 1 as mentioned above. In particular, at least one storage battery 12 and at least one power generator 40 are preferably included as distributed power sources of the second type in this embodiment.

The power controller 10 is described in more detail below.

The power controller 10 includes a controller 11, the storage battery 12, voltage transformers 13A to 13D, an inverter 14, and switches 15 to 18, as illustrated in FIG. 1.

The controller 11 controls and manages the whole power controller 10, and may be realized by a processor or the like. The control performed by the controller 11 in this embodiment will be described in detail later.

The storage battery 12 is as described above. Although FIG. 1 illustrates the power controller 10 as a built-in storage battery type power controller including the storage battery 12, the power controller 10 may receive power from a storage battery installed outside the power controller 10 in this embodiment.

The voltage transformers 13A to 13D are each a step-up/down circuit for stepping up or down the voltage of input DC power. As illustrated in FIG. 1, the voltage transformer 13A is connected to transfer electrical energy between the photovoltaic power generator 31 and the inverter 14. The voltage transformer 13A transforms the power generated by the photovoltaic power generator 31 into an appropriate voltage, and outputs the transformed power to the inverter 14 as appropriate. The voltage transformer 13B is connected to transfer electrical energy between the photovoltaic power generator 32 and the inverter 14. The voltage transformer 13B transforms the power generated by the photovoltaic power generator 32 into an appropriate voltage, and outputs the transformed power to the inverter 14 as appropriate.

The inverter 14 has one end connected to the point of connection between the outputs of the voltage transformers 13A and 13B so that the outputs of the voltage transformers 13A and 13B can be grid-interconnected together, as illustrated in FIG. 1. The inverter 14 is a circuit for converting the DC power of the plurality of distributed power sources into AC power for grid-interconnection together. The inverter 14 may also convert the AC power supplied form the electric power grid into DC power in order to, for example, charge the storage battery 12.

The voltage transformer 13C is connected to the fuel cell power generator 40, and transforms the power generated by the fuel cell power generator 40 into an appropriate voltage and outputs the transformed power. The voltage transformer 13D is connected to the storage battery 12, and transforms the power with which the storage battery 12 is charged into an appropriate voltage and also transforms the discharge power of the storage battery 12 into an appropriate voltage. The voltage transformers 13C and 13D are connected to each other so that the storage battery 12 can be charged with the power generated by the fuel cell power generator 40, as illustrated in FIG. 1.

The switch 15 is placed between the point of connection between the outputs of the voltage transformers 13A and 13B and the point of connection between the outputs of the voltage transformers 13C and 13D, and connects or disconnects the two connection points. In this embodiment, the switch 15 is preferably placed before the position of the inverter 14 that converts the power from the photovoltaic power generators 31 and 32 (the distributed power source of the first type) and the power from the storage battery 12 and fuel cell power generator 40 (the distributed power source of the second type) into AC power together.

The switches 15 to 18 each connect or disconnect a power supply line. The switches 15 to 18 may each be realized by any relay switch as an example. The switches 15 to 18 are preferably controlled by the controller 11 to switch between connection and disconnection. The control by the controller 11 in this case will be described in detail later.

In the disconnection (off) state of the switch 15, only the outputs of the photovoltaic power generators 31 and 32 are connected to the electric power grid, and the outputs of the fuel cell power generator 40 and storage battery 12 are disconnected from the electric power grid. In the connection (on) state of the switch 15, on the other hand, not only the outputs of the photovoltaic power generators 31 and 32 but also the outputs of the fuel cell power generator 40 and storage battery 12 are connected to the electric power grid together. Thus, in this embodiment, the switch 15 switches between the parallel state in which the distributed power source of the second type is interconnected to the grid together with the distributed power source of the first type and the parallel off state in which the distributed power source of the second type is independent of the distributed power source of the first type and is paralleled off from the grid.

The switch 16 is a switch (grid interconnection relay switch) for switching the grid-interconnection of the distributed power sources. When the switch 16 is on, the outputs of the photovoltaic power generators 31 and 32, fuel cell power generator 40, and storage battery 12 are paralleled to the grid together so that the outputs of the distributed power sources are grid-interconnected together. When the switch 16 is off, the outputs of the photovoltaic power generators 31 and 32, fuel cell power generator 40, and storage battery 12 are all paralleled off from the grid so that the outputs of the distributed power sources are not grid-interconnected.

The switch 17 is a switch (grid interconnection bypass switch) for connecting the path for supplying the outputs of the distributed power sources and/or electric power grid to the loads when the distributed power sources are grid-interconnected.

The switch 18 is a switch (independent relay switch) for connecting the path for supplying the outputs of the distributed power sources to the loads when the distributed power sources are not grid-interconnected. When the switch 16 is off, the switch 18 is on, thus supplying the outputs of the distributed power sources to the loads when the distributed power sources are paralleled off from the grid (independent operation). During such independent operation (the switch 16 is off and the switch 18 is on), the switch 17 is off. During operation other than independent operation, the switch 17 is on.

The distribution board 20 further includes a sensor 23, as illustrated in FIG. 1. The sensor 23 detects the power output from the power controller 10 to the electric power grid through the distribution board 20, i.e. the outputs of the distributed power sources reversely flowing to the electric power grid together. In detail, the sensor 23 detects that at least one of the output of the distributed power source of the first type such as the photovoltaic power generators 31 and 32 and the output of the distributed power source of the second type such as the storage battery 12 and the fuel cell power generator 40 reversely flows to the grid. The sensor 23 may be realized by, for example, any current sensor such as a current transformer (CT). The result of detection by the sensor 23 is notified to the controller 11. The controller 11 can recognize the result of detection by the sensor 23 in this way.

The power controller 10 according to this embodiment may further include an operation unit for operation input by an operator. The power controller 10 according to this embodiment may further include a display unit for displaying the details of control by the power controller 10 and various notifications. The operation unit and/or the display unit may be provided on the surface of the housing of the power controller 10, or provided outside the power controller 10 as a terminal such as a remote controller.

The control by the controller 11 is described in more detail below.

The controller 11 controls on/off of the switches 15 to 18 in this embodiment, as mentioned earlier. The dashed lines in FIG. 1 indicate control lines for such control. The controller 11 also controls the power generation and output of each distributed power source, etc., although the detailed description of such control and the illustration of the corresponding control lines are omitted.

A basic example of the operation of the power controller 10 according to this embodiment is described below.

In the power controller 10 according to this embodiment, when the switches 16 and 17 are on and the sensor 23 detects reverse power flow, the controller 11 controls the switch 15 to be off. In the case where the switches 16 and 17 are on and the distributed power sources are paralleled to the grid together to be in the grid-interconnected state, there is a possibility that the output of the distributed power source of the second type such as the storage battery 12 and the fuel cell power generator 40 reversely flows to the grid. Accordingly, in the state where reverse power flow is detected, the switch 15 is turned off to parallel off the distributed power source of the second type from the grid, thus preventing the reverse power flow of the output of the distributed power source of the second type.

In detail, in this embodiment, the controller 11 controls the switch 15 so that, during reverse power flow, the distributed power source of the second type such as the fuel cell power generator 40 is paralleled off from the grid and only the power generated by the distributed power source of the first type such as the photovoltaic power generators 31 and 32 reversely flows to the grid. When the power generated by the distributed power source of the first type such as the photovoltaic power generators 31 and 32 reversely flows to the grid, the controller 11 maintains the on state of the switches 16 and 17 beforehand so that the distributed power source of the first type is paralleled to the grid.

Here, since the switches 16 and 17 are on, the power generated by the distributed power source of the first type is also supplied to the loads through the breakers 22A to 22E.

While the power generated by the distributed power source of the first type such as the photovoltaic power generators 31 and 32 reversely flows to the grid, the fuel cell power generator 40 and the storage battery 12 are paralleled off from the grid. Therefore, even during the reverse power flow of the outputs of the photovoltaic power generators 31 and 32, the fuel cell power generator 40 can generate power and output it to charge the storage battery 12 without reverse power flow.

Inefficient situations of the power controller 10 can therefore be avoided in the case where the distributed power source of the first type such as the photovoltaic power generators 31 and 32 and the distributed power source of the second type such as the storage battery 12 and the fuel cell power generator 40 are grid-interconnected together. In detail, it is possible to avoid inefficient situations such as giving up the reverse power flow of the distributed power source of the first type in order to prevent the reverse power flow of the distributed power source of the second type, or stopping the fuel cell power generator 40 and the storage battery 12 during the reverse power flow of the distributed power source of the first type.

Hence, while the output of the distributed power source capable of reverse power flow reversely flows to the grid, the output of the distributed power source incapable of reverse power flow is used to charge the storage battery without reversely flowing to the grid. This further enhances the convenience of the power controller capable of grid interconnection of the outputs of the plurality of distributed power sources together.

In the case where the switches 16 and 17 are on and the sensor 23 does not detect reverse power flow, on the other hand, the switch 15 can be turned on. Examples of the case where the switches 16 and 17 are on and the sensor 23 does not detect reverse power flow include a situation where none of the distributed power sources generates power and a situation where the outputs of the distributed power sources are all consumed by the loads and there is no surplus power.

When the power generated by the distributed power source of the first type (the photovoltaic power generators 31 and 32) does not reversely flow to the grid, the controller 11 may perform such control that supplies at least one of the output of the distributed power source of the first type and the output of the distributed power source of the second type (the storage battery 12 and the fuel cell power generator 40) to the loads. In such a case, the controller 11 may also supply at least one of the output of the distributed power source of the first type and the output of the distributed power source of the second type to the storage battery 12 to charge the storage battery 12.

During independent operation (the switches 16 and 17 are off and the switch 18 is on), the outputs of the distributed power sources are not grid-interconnected, and so the switch 15 can be turned on.

Thus, the controller 11 may perform such control that parallels off the distributed power source of the first type (the photovoltaic power generators 31 and 32) and the distributed power source of the second type (the storage battery 12 and the fuel cell power generator 40) from the grid and supplies at least one of the output of the distributed power source of the first type and the output of the distributed power source of the second type to the loads. In such a case, too, the controller 11 may also supply at least one of the output of the distributed power source of the first type and the output of the distributed power source of the second type to the storage battery 12 to charge the storage battery 12.

Figure 2:
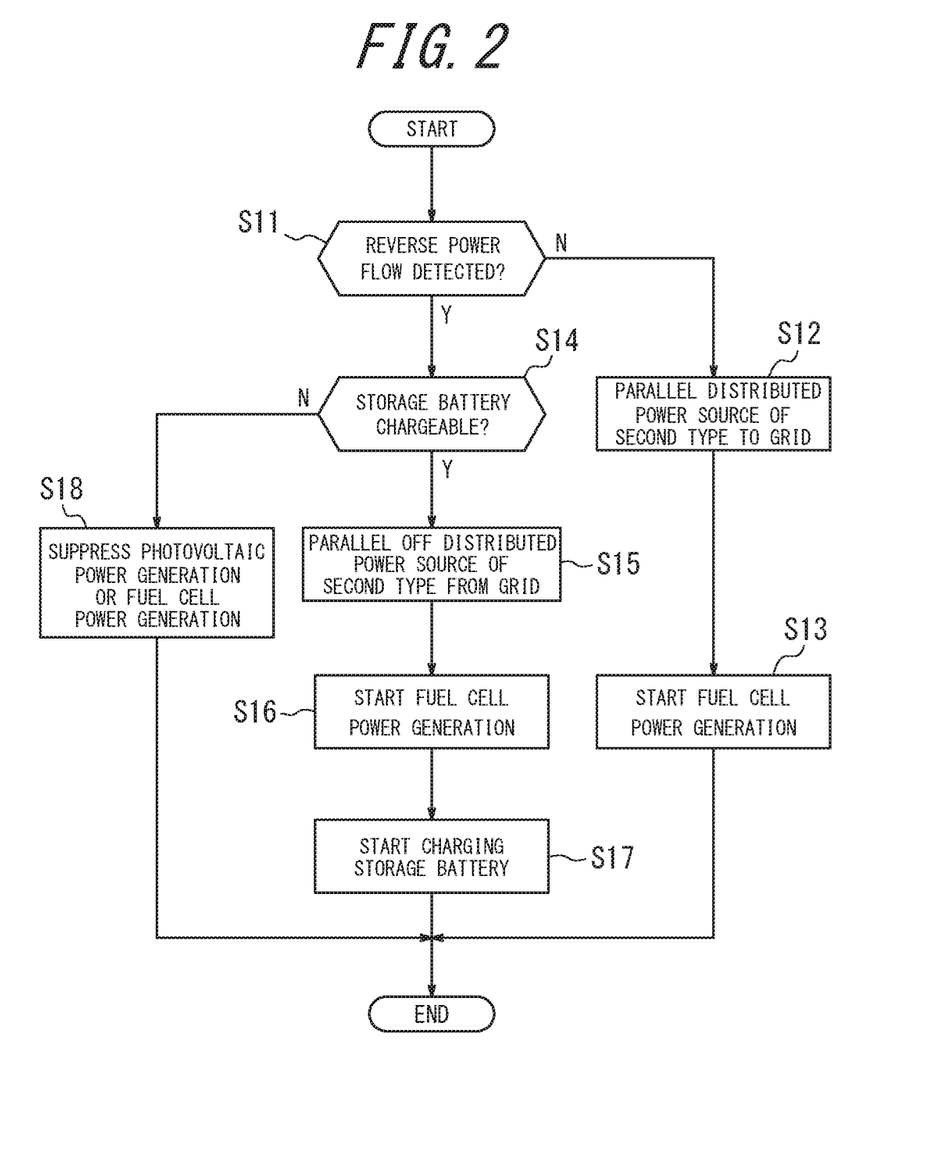
FIG. 2 is a flowchart illustrating an example of the operation of a power controller according to one of the disclosed embodiments.

An example of the operation of the power controller 10 according to this embodiment in actual use is described below. FIG. 2 is a flowchart illustrating an example of the operation of the power controller 10 according to this embodiment.

The operation illustrated in FIG. 2 starts when, for example, the power controller 10 or the power control system 1 is activated. Alternatively, for example in the case where the fuel cell power generator 40 is realized by a SOFC or the like, hot water is generated with the operation of the fuel cell power generator 40, and accordingly the operation illustrated in FIG. 2 may start when the fuel cell power generator 40 is activated or the hot water generation begins.

An example of starting the operation in the state where the switches 15, 16, and 17 are on is described first. When the operation illustrated in FIG. 2 starts, the controller 11 determines whether or not the sensor 23 detects reverse power flow (step S11).

In the case where no reverse power flow is detected in step S11, the controller 11 maintains the on state of the switches 15, 16, and 17 because paralleling the distributed power source of the second type (the storage battery 12 and the fuel cell power generator 40) to the grid causes no problem (step S12). The controller 11 then controls the fuel cell power generator 40 to start generating power (step S13). In this case, the output of each distributed power source is supplied to the loads and/or the storage battery 12.

In the case where reverse power flow is detected in step S11, the controller 11 determines whether or not the storage battery 12 is chargeable (step S14). For example, the storage battery 12 is chargeable when the storage battery 12 is not fully charged and operates normally.

In the case where the storage battery 12 is chargeable in step S14, the controller 11 controls the switch 15 to be off, to parallel off the distributed power source of the second type (the storage battery 12 and the fuel cell power generator 40) from the grid (step S15). The controller 11 then controls the fuel cell power generator 40 to start generating power (step S16), and the storage battery 12 to be charged with the generated power (step S17). In this case, since the distributed power source of the second type not capable of power selling has been paralleled off from the grid, the output of the distributed power source of the second type does not reversely flow to the grid.

In the case where the storage battery 12 is not chargeable in step S14, the controller 11 reduces the total power generation to a level at which no reverse power flow occurs by, for example, suppressing the power generation of the photovoltaic power generators 31 and 32 or suppressing the power generation of the fuel cell power generator 40 (step S18). The storage battery 12 is not chargeable when, for example, the storage battery 12 is already fully charged or nearly fully charged.

The process in step S18 is described in more detail below.

If the storage battery 12 is already fully charged or nearly fully charged in step S14 in the operation illustrated in FIG. 2, the storage battery 12 is already unchargeable or is soon to be unchargeable. In this case, since reverse power flow has been detected in step S11, the switch 15 cannot be turned on to grid-interconnect the distributed power source of the second type. Besides, the storage battery 12 cannot accept power because the storage battery 12 is already fully charged or nearly fully charged. It is therefore going to be soon impossible to keep charging the storage battery 12 with the output of the fuel cell power generator 40 unless the power consumed by the loads soon increases significantly.

Accordingly, if the power generation of the fuel cell power generator 40 needs to be prioritized in order to, for example, maintain hot water generation, the controller 11 suppresses or stops the power generation of the photovoltaic power generators 31 and 32 (step S18). By suppressing or stopping the power generation of the photovoltaic power generators 31 and 32, surplus power (more power than the loads can consume) decreases and reverse power flow no longer occurs, so that the sensor 23 does not detect reverse power flow. This allows the switch 15 to be turned on.

If the power generation of the photovoltaic power generators 31 and 32 needs to be prioritized even though, for example, hot water generation is interrupted, on the other hand, the controller 11 suppresses or stops the power generation of the fuel cell power generator 40 (step S18). Alternatively, for example, the controller 11 may perform overall control in step S18 based on the balance in output between the photovoltaic power generators 31 and 32 and the fuel cell power generator 40.

In the case of suppressing the power generation of any distributed power source in this way, the controller 11 may control the distributed power source itself, or control the corresponding one of the voltage transformers 13A to 13D as an example. The details of such control may be defined in the controller 11 beforehand according to the user's desire, or the controller 11 may intelligently determine the most appropriate control depending on various conditions.

In the case where the fuel cell power generator 40 is a SOFC or the like, the power generation efficiency is said to be higher when rated output is always maintained. Besides, in the case where hot water is generated with the operation of the fuel cell power generator 40 as in a SOFC, suppressing or stopping the power generation of the fuel cell power generator 40 causes a decrease in supply amount or heat quantity of hot water from the normal level. This makes it impossible to efficiently benefit from the power generation of the fuel cell power generator 40. It is therefore desirable to avoid the unchargeable state of the storage battery 12 as much as possible.

The method for avoiding the unchargeable state of the storage battery 12 as much as possible in step S14 is described below.

To avoid the unchargeable state of the storage battery 12 as much as possible in step S14, the controller 11 may control, for example, the timing and amount of charging/discharging the storage battery 12 in this embodiment.

There are instances where the timing and amount of supply of power that is desired to be supplied to the loads in the home and/or hot water that is desired to be supplied in the home are predictable to a certain extent by the controller 11 based on the past history and the like. There are also instances where future demand for power and/or hot water is able to be estimated to a certain extent, depending on the user. In such instances, the need to preset the power controller 10 accordingly may arise.

Hence, in the case where the power generation schedule of the fuel cell power generator 40 is known or is predictable to a certain extent, the controller 11 may suppress the charging of the storage battery 12 beforehand based on the schedule. If suppressing the charging of the storage battery 12 is insufficient, the controller 11 may cause the storage battery 12 to discharge, based on the power generation schedule of the fuel cell power generator 40. Thus, in this embodiment, the controller 11 may control the power storage in the storage battery 12 based on the power generation schedule of the fuel cell power generator 40. Further, in the case where the power generation schedule of the fuel cell power generator 40 is known or is predictable to a certain extent, the controller 11 may control the power supply from the storage battery 12 to the loads as appropriate based on the schedule.

In the case where whether or not the storage battery 12 is chargeable is able to be determined to a certain extent beforehand based on the charging/discharging schedule of the storage battery 12, the controller 11 may, for example, suppress or stop the power generation of the fuel cell power generator 40 based on this schedule. The controller 11 may thus control the power generation of the fuel cell power generator 40 based on the power storage schedule of the storage battery 12. The controller 11 may also control the power generation of the fuel cell power generator 40 based on the amount of power stored in the storage battery 12. Here, the controller 11 may control the power generation of the fuel cell power generator 40 based on the amount of power currently stored in the storage battery 12, or control the power generation of the fuel cell power generator 40 based on the history of the amount of power stored in the past or the prediction of the amount of power stored in the future. The controller 11 may also control the power supply from the storage battery 12 to the loads, based on various conditions including at least one of the power generation schedule of the fuel cell power generator 40, the power storage schedule of the storage battery 12, and the amount of power stored in the storage battery 12.

The controller 11 may also control the power generated by at least one of the distributed power sources and/or the power supplied from at least one of the distributed power sources to the loads, based on various conditions including at least one of the power generation schedule of the fuel cell power generator 40, the power storage schedule of the storage battery 12, and the amount of power stored in the storage battery 12. According to this embodiment, it is therefore possible to intelligently control the power generation of each distributed power source, the charging/discharging of the storage battery, the power supply from at least one of the distributed power sources to the loads, the power sold to the electric power grid, the power purchased from the electric power grid, etc.

The following describes a modification to the embodiment described above.

Figure 3:
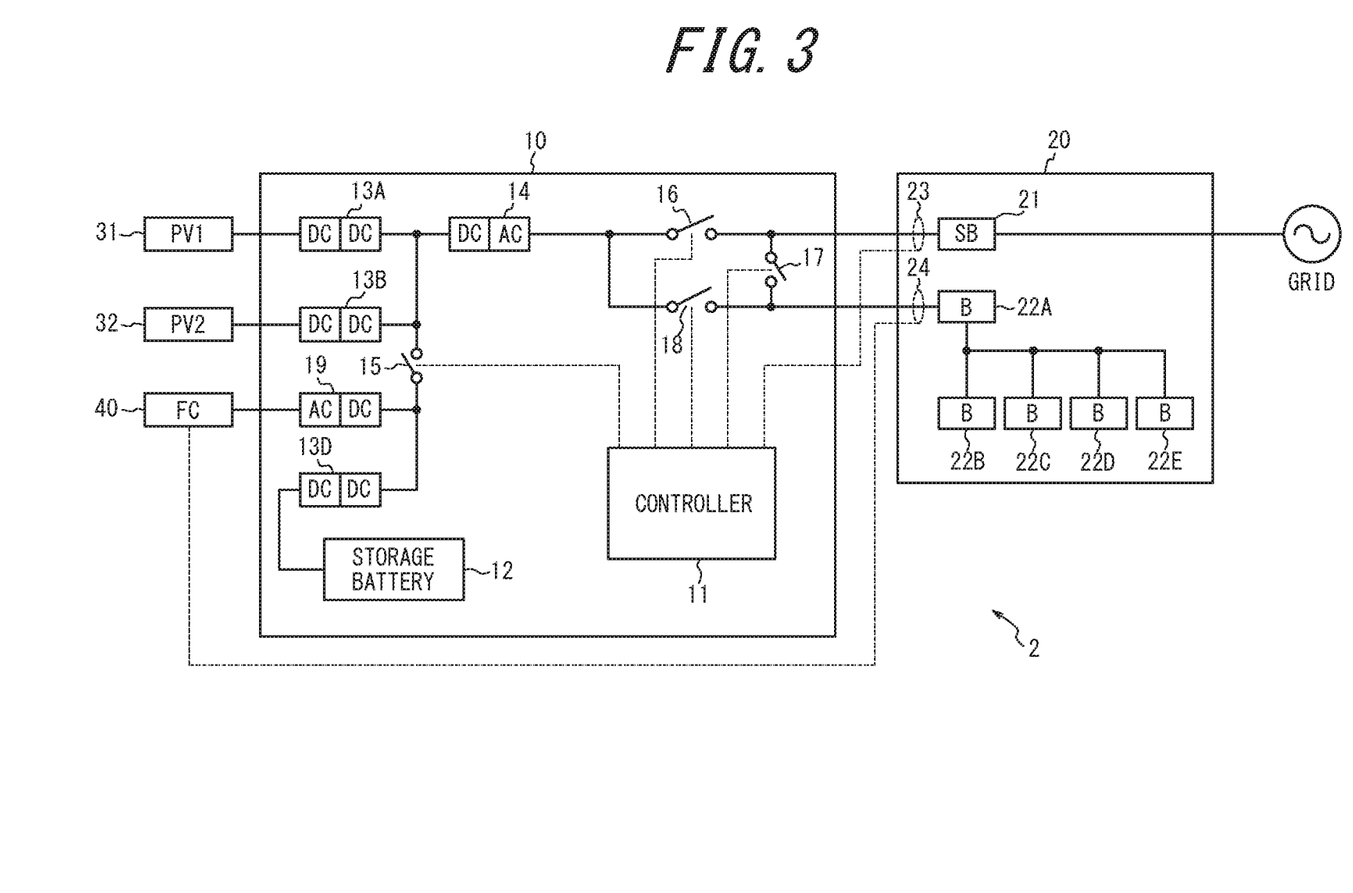
FIG. 3 is a functional block diagram schematically illustrating a modification to the power control system according to one of the disclosed embodiments.

FIG. 3 is a functional block diagram schematically illustrating a modification to the power control system according to one of the disclosed embodiments. The following mainly describes the different features of a power control system 2 illustrated in FIG. 3 from those of the power control system 1 illustrated in FIG. 1, while omitting the description of the same features as appropriate.

In FIG. 3, an inverter 19 is provided in place of the voltage transformer 13C in FIG. 1. The inverter 19 converts the AC power output from the fuel cell power generator 40 into DC power. Moreover, in FIG. 3, a sensor 24 is provided in the distribution board 20 at the position where the power supplied to the loads is input. The sensor 24 is connected to the fuel cell power generator 40.

Some of the existing fuel cell power generation systems include an inverter in the power generation system so that AC power can be directly supplied to loads. Such a fuel cell power generation system converts the generated DC power into AC power within the system and outputs the AC power. In the case of using such a fuel cell power generator in the disclosed power control system, the power control system needs to support the AC output of the fuel cell power generator.

In this case, the power controller 10 desirably includes the inverter 19 so that the AC power supplied from the fuel cell power generator 40 as a distributed power source can be accepted, as illustrated in FIG. 3. With the power controller 10 illustrated in FIG. 3, the disclosed power control system can be introduced into homes in which the fuel cell power generation system has already been introduced, while continuing to use the fuel cell power generation system. The structure of the modification to the embodiment therefore realizes a more versatile power control system.

The aforementioned conventional fuel cell power generation system including the inverter also includes a current sensor such as a CT in some cases. The fuel cell power generation system including the current sensor tends to have specifications in which power is generated only when the current sensor detects forward power flow to the loads. In the case of using such a fuel cell power generator in the disclosed power control system, a current sensor may be placed as the sensor 24 in FIG. 3 to notify the detection result of the sensor 24 to the fuel cell power generator 40.

With this structure, when the loads in the home consume power, the sensor 24 detects the current of forward power flow to the loads, so that the fuel cell power generator 40 can generate power. An ordinary home has a number of electric appliances. When there is human life in the home, each electric appliance requires standby power and also each appliance operating all the time such as a refrigerator requires power, meaning that loads are always present. Since the sensor 24 always detects the current of forward power flow to the loads, the fuel cell power generator 40 can always generate power.

On the other hand, in the case where the disclosed power control system is introduced into a home having no fuel cell power generation system including an inverter, not the structure illustrated in FIG. 3 but the power control system 1 illustrated in FIG. 1 enables the use of a fuel cell power generator including no inverter. In this case, the number of power conversions is reduced, which contributes to higher power generation efficiency.

While the power controller and the power control system including the power controller according to this embodiment have been described above, the disclosure also includes a power control method in the power controller described above.

Although the disclosed device, method, and system have been described by way of the drawings and embodiments, various changes and modifications may be easily made by those of ordinary skill in the art based on the disclosure. Such various changes and modifications are therefore included in the scope of the disclosure. For example, the functions included in the functional units, means, steps, etc. may be rearranged without logical inconsistency, and a plurality of functional units, steps, etc. may be combined into one functional unit, step, etc. and a functional unit, step, etc. may be divided into a plurality of functional units, steps, etc. Moreover, each of the disclosed embodiments is not limited to the strict implementation of the embodiment, and various features may be combined as appropriate.

The foregoing embodiment describes the case where the distributed power source of the first type capable of reverse power flow is the photovoltaic power generators 31 and 32. However, the distributed power source of the first type is not limited to the photovoltaic power generators 31 and 32, and may be any distributed power source that generates power by means other than photovoltaic power generation, such as wind power generation, as long as it is capable of reverse power flow.

In the power control system described above, a distribution board specific to the power controller 10 may be added between the power controller 10 and the distribution board 20. The use of the specific distribution board is advantageous as it contributes to maintenance when the power controller 10 fails or is repaired.

The foregoing embodiment describes the case where the power controller grid-interconnects the outputs of the distributed power sources as DC power sources together. However, the distributed power sources are not limited to DC power sources, and AC power sources may also be used.

REFERENCE SIGNS LIST

1 power control system
10 power controller
11 controller
12 storage battery
13A to 13D voltage transformer
14, 19 inverter
15 to 18 switch
20 distribution board
21 service breaker
22A to 22E breaker
23, 24 sensor
31, 32 photovoltaic power generator
40 fuel cell power generator

The invention claimed is:

1. A power controller capable of grid interconnection of at least one distributed power source of a first type and distributed power sources of a second type together, wherein the distributed power sources of the second type include a battery and a power generator, the power controller comprising:
a switch configured to switch between a parallel state in which the distributed power sources of the second type are interconnected to a grid together with the at least one distributed power source of the first type and a parallel off state in which the distributed power sources of the second type are independent of the at least one distributed power source of the first type and are paralleled off from the grid; and
a controller configured to
detect reverse power flow from the distributed power sources of the first and second types to the grid, and, in response to detecting the reverse power flow while the battery is chargeable, cause the switch to be in the parallel off state.

2. The power controller according to claim 1, wherein the switch is placed before a position where power generated by the at least one distributed power source of the first type and power generated by the distributed power sources of the second type are converted into AC power together.

3. The power controller according to claim 1, comprising a sensor configured to detect that at least one of an output of the at least one distributed power source of the first type and an output of the distributed power sources of the second type reversely flows to the grid.

4. The power controller according to claim 1, wherein the at least one distributed power source of the first type is capable of reverse power flow, and the distributed power sources of the second type are not capable of reverse power flow.

5. The power controller according to claim 1, wherein the at least one distributed power source of the first type is a photovoltaic power generator or a wind power generator, and the distributed power sources of the second type are each a power generator other than a photovoltaic power generator and a wind power generator.

6. The power controller according to claim 1, wherein the controller is configured to cause power generated by the power generator to be stored in the battery when power generated by the at least one distributed power source of the first type reversely flows to the grid.

7. The power controller according to claim 6, wherein the controller is configured to control power storage in the battery, based on at least one of a power generation schedule of the power generator, a power storage schedule of the battery, and an amount of power stored in the battery.

8. The power controller according to claim 6, wherein the controller is configured to control power supply to a load, based on at least one of a power generation schedule of the power generator, a power storage schedule of the battery, and an amount of power stored in the battery.

9. The power controller according to claim 1, wherein, in the parallel off state, the at least one distributed power source of the first type is connected to the grid.

10. A power control method for grid interconnection of at least one distributed power source of a first type and distributed power sources of a second type together, wherein the distributed power sources of the second type include a battery and a power generator, the power control method including steps of:
detecting whether or not reverse power flow occurs from the distributed power sources of the first and second types to a grid;
causing the distributed power sources of the second type to be interconnected to the grid together with the at least one distributed power source of the first type when no reverse power flow occurs; and
causing the distributed power sources of the second type to be independent of the at least one distributed power source of the first type and be paralleled off from the grid in response to detecting that the reverse power flow occurs and the battery is chargeable.

11. A power control system comprising:
at least one distributed power source of a first type;
distributed power sources of a second type, wherein the distributed power sources of the second type include a battery and a power generator; and
a power controller capable of grid interconnection of the at least one distributed power source of the first type and the distributed power sources of the second type together,
wherein the power controller is configured to
detect whether or not reverse power flow occurs from the distributed power sources of the first and second types to a grid,
cause the distributed power sources of the second type to be interconnected to the grid together with the at least one distributed power source of the first type when no reverse power flow occurs, and
cause the distributed power sources of the second type to be independent of the at least one distributed power source of the first type and be paralleled off from the grid in response to detecting that the reverse power flow occurs and the battery is chargeable.

* * * * *